United States Patent [19]

Smith et al.

[11] Patent Number: 4,884,929

[45] Date of Patent: Dec. 5, 1989

[54] FLUSH HEAD FASTENER

[75] Inventors: Charles R. Smith, Toluca Lake; Anthony E. Brindisi, Riverside; Gerald W. Tyree, Sun Valley, all of Calif.

[73] Assignee: Lockheed Corporation, Calabasas, Calif.

[21] Appl. No.: 135,852

[22] Filed: Dec. 21, 1987

[51] Int. Cl.$^4$ .................. F16B 19/00; F16B 31/00; F16B 33/00
[52] U.S. Cl. .................................... 411/3; 411/82; 411/377; 411/903; 244/1 A
[58] Field of Search .......................... 411/3–5, 411/373, 376, 377, 372, 371, 903, 82; 361/218; 244/1 A; 292/251

[56] References Cited

U.S. PATENT DOCUMENTS

| | | | |
|---|---|---|---|
| 1,145,256 | 7/1915 | Mochow et al. | 411/82 |
| 3,812,757 | 5/1974 | Reiland | 411/5 |
| 4,479,163 | 10/1984 | Bannink, Jr. et al. | 361/218 |
| 4,502,092 | 2/1985 | Bannink, Jr. et al. | 361/218 |
| 4,628,402 | 12/1986 | Covey | 361/218 |
| 4,630,168 | 12/1986 | Hunt | 361/218 |
| 4,681,497 | 7/1987 | Berecz | 411/377 |

OTHER PUBLICATIONS

Hodgson, Abstract of Application S. N. 628,044, published May 20, 1952, 658 O.G. 915.

Primary Examiner—Neill R. Wilson
Attorney, Agent, or Firm—Louis L. Dachs

[57] ABSTRACT

The invention is a flush head fastener for joining two or more structural elements together. The structural elements have a fastener hole therein with one of the structural elements being countersunk to accommodate the head of the fastener. The fastener includes head and shank portions and a layer of material joined to the top of the head of the fastener which can readily be deformed to fill any gaps between the head and the countersink. Thereafter, the excess material can be removed leaving an aerodynamically smooth surface. The surface also will have no electrical discontinuities. The procedure for installing the fastener includes the steps of (1) providing two or more structural elements having a countersunk fastener hole therein (2) thereafter the fastener is installed in the hole (3) the layer of material is deformed so as to fill any gaps between the head of the fastener and the countersink, and (4) thereafter, excess material is removed leaving a smooth external surface. Preferably, the step of deforming includes the step of heating the layer of material to a point where it is readily deformable.

12 Claims, 3 Drawing Sheets

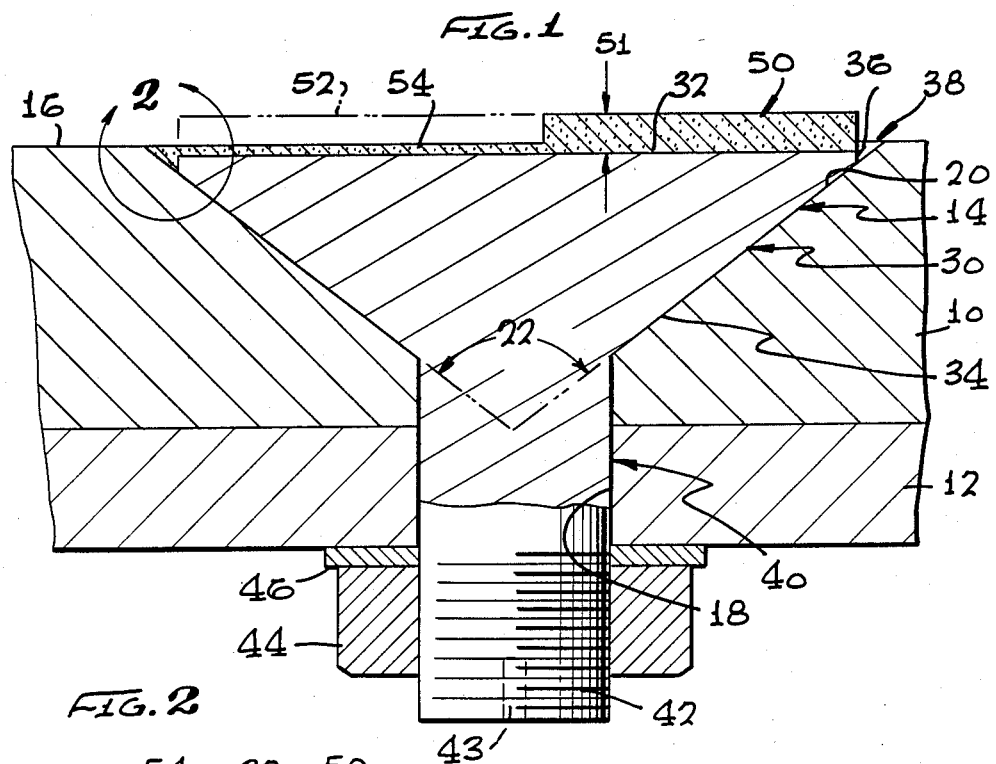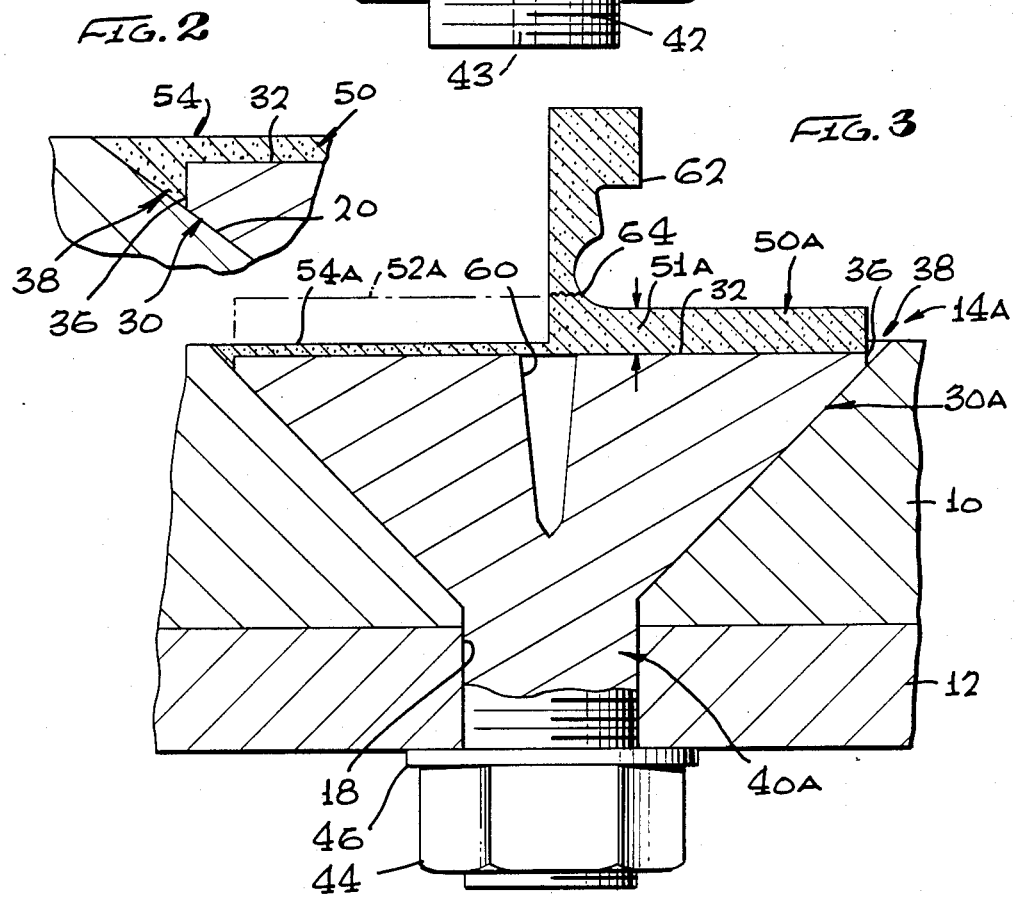

FLUSH HEAD FASTENER

TECHNICAL FIELD

The invention relates to the field of fasteners and, in particular, to flush head fasteners which can be blended into the external contour of a vehicle such as the aerodynamic surfaces of an aircraft.

BACKGROUND INFORMATION

Flush head fasteners are used where surfaces must be smooth and free of protrusions, for example, the Aerodynamic surfaces of aircraft; where, in order to reduce drag, flush head fasteners are almost exclusively used. The fastener hole is countersunk at a total included angle of around 100 degrees for metals and 130 degrees for composites with the total underhead included angle of the fastener made approximately equal thereto. In order to achieve a smooth aerodynamic contour, the countersink overall diameter is usually made slightly larger than the diameter of the fastener head such that upon installation, the top surface of the fastener head will e below the aerodynamic surface. This is also necessary because the fastener at the junction of the upper and underhead surface of the head normally includes a small cylindrical land to eliminate any sharp edges that would otherwise exist at the junction thereof. What is usually left upon installation is a small countersunk ring about the fastener head. Of course, if the fastener is being installed on a curved surface, the countersunk hole will be elliptical in shape and thus the gap around the fastener head becomes uneven. These sort of gaps are commonly called "eyebrows". Another surface discontinuity is the typical internal wrenching recess in the fastener head, i.e., phillips, slot, tri-wing, allen, etc. Thus, if it is necessary to have an absolutely smooth aerodynamic surface or if no electrical discontinuities can be tolerated, the recess and the exposed portion of the countersunk hole "eyebrows" must be covered.

Typically, putties are used; conductive ones if electrical continuity is required. Another method is to use covers bonded to the fastener head or retained by means of a protrusion on the cap which is jammed into the internal wrenching recess in the fastener head. Neither of these methods provide any guarantee of a smooth external contour and, of course gaps and discontinuities, while reduced in size, will always be present.

The internal wrenching recess can be eliminated if the fastener can be torqued from the shank end. For example, the internal wrenching recess can be provided at the threaded end of the fastener. However, in many applications, access to the opposite end of the fastener is restricted so this solution is not often viable. Another approach is to use detachable (frangible) external torquing surfaces attached to the head of the fastener designed to break off after the proper torque level is reached. Such a fastener has several disadvantages: there is no way of removing it except by means of an easy out (requiring drilling into the fastener head itself) and a rough external head surface remains. Thus, such fasteners are not used on external aerodynamic surfaces.

Another problem occurs when the aerodynamic surface is made of composite materials, such as graphite fiber reinforced epoxy resins. When used in the wings of aircraft which contain fuel, a significant safety problem can exist; for while the structure of the wing may be made of composite materials, the fasteners used are typically metal in order to obtain sufficient structural strength. The difference in electrical conductivity between the composite material and the fastener causes lightning to become attached to the metallic fastener head and the fastener can conduct current into the interior of the wing and cause internal arcing inside the fuel tank. If fuel vapors are present in the tank, such arcing can cause an explosion. Therefore, it is necessary to provide some sort of protection for external metal fasteners used in composite structures to prevent such lightning strikes attaching thereto.

Typically, a coat of paint is applied over the aerodynamic surfaces. However, the gap between the fastener head and its countersink hole can cause the paint to thin and crack around the outer edge of the fastener. This thinning and cracking of the paint in turn causes a difference in electrical conductivity, which causes electrical streamers to form around the edges of the fastener heads. These streamers create an electrical field and increase the chance of a lightning strike hitting a fastener head. To eliminate this possibility various devices to cover the fastener head have been proposed. For example, U.S. Pat. No. 4,630,168 "Lightning Protection Fastener" by J. Hunt, discloses a fastener having a metallic head and shaft and a dielectric cap covering a top portion of the head. When the head and cap are installed into the countersunk hole in the skin, the cap being resilient tends to fill the gap between the top portion of the head and the inner side walls of the countersink. The cap forms with the skin an aerodynamic surface which is sufficiently continuous to receive and maintain a crack free coat of paint having a uniform thickness.

The problem here is that the cap encompasses a portion of the underhead conical surface and when installed is wedged between the fastener head and the countersunk hole. This presents a problem in heavily loaded structures in that the resilient material between the fastener head and countersink will tend to extrude under cyclic loading and the fastener may eventually become loose fitting therein. Additionally, since the cap is installed with a given thickness and tolerance it may not always provide an absolutely smooth external contour. Another approach to providing protection for metal fasteners in composite structures is found in U.S. Pat. No. 4,681,497 "Encapsulated Fastener" by I. Berecz. Here the head and shank are encapsulated in composite material and thus, it is subject to the same deficiencies as the preceding example. Another approach can be found in U.S. Pat. No. 4,502,092 "Integral Lightning Protection System for Composite Aircraft Skins" by E.T. Bannink, Jr. et al. Here a plastic strip is placed over the outer surface and a potting compound is used to fill the space over the fastener. In U.S. Pat. 4,628,402 "Lightning Protection of Fasteners in Composite Material" by J.H. Covey, one embodiment uses a rubber plug over the fastener to fill the space above the fastener caused by the layers of dielectric material. None of the above fastener systems designed for use with composite materials are suitable for use with metal surfaces. Thus, there is no available fastener design that can provide a smooth continuous aerodynamic surface in both composite and metal structures and which does not require a paint be applied over the surface, etc.

Thus, it is a primary object of the subject invention to provide a flush head fastener that is capable of producing an aerodynamically smooth external surface.

It is another primary object of the subject invention to provide a flush head fastener that is capable of providing an aerodynamically smooth external surface when the surface is curved.

It is another object of the subject invention to provide a flush head fastener that produces no electrical discontinuities on the surface after installation.

It is a further object of the subject invention to provide a flush head fastener that can be used with both metal and composite materials.

DISCLOSURE OF THE INVENTION

The invention is an improved flush head fastener for use in countersunk fastener holes. The fastener is designed for use in structures wherein the fastener must be completely conformed with the surface and any gap between the fastener head and countersink must be completely filled. In detail, the invention is a flush head fastener of the type having a head and shank portion for joining two or more structural elements together. The structural elements incorporate a fastener hole therein with a countersunk end for receiving the head of the fastener. The countersunk portion of the hole is in communication with one external surface of the structural elements such as an exterior aerodynamic surface of an aircraft. A layer of material is joined to the top of the head of the fastener which is readily deformable relative to the fastener shank and head and structural elements; such that upon installation of the fastener in the hole, the layer of material can be deformed filling any gap between the fastener and the countersink and excess material above that needed to blend the layer of material into conformity with the surface can be readily removed. Preferably, the layer of material has a melting point substantially lower than the melting point of the flush head fastener and the structural elements such that after installation of the fastener, the layer of material can be heated to a temperature wherein it is readily deformable relative to the fastener and the structural elements.

If the external surface is made of titanium and a steel fastener is used then the layer of material could be made of a soft non-heat treated titanium alloy or the pure metal itself. This layer can be friction welded to the head of the fastener. Other means that can be used are brazing, soldering, and bonding, etc. If the external surface is aluminum and a titanium or steel fastener is used, then the layer of material can be pure aluminum or a compatible solder. Whether or not the layer of material would be heated or not would depend on the combination of materials selected which will be obvious to those skilled in the art. However, if the external surface is a composite material having an organic matrix, then, ideally, the layer of material is selected from the large group of presently available thermoplastic resins. Here the thermoplastic resin layer can easily be heated to a point where it is deformable. In most applications the heating of the layer of material need only raise the temperature to a point wherein it is easily deformable. It must be understood that the layer of material could be heated to a point wherein it melts.

While the above description has been directed at a fastener having a metal head and shank, it must be understood that they could be made of a plastic material or an organic matrix composite material as long as the plastic or matrix materials have a higher service temperature (higher melting point) and/or are harder than the layer of material. Furthermore, the fastener could be designed for use in a spherical countersink, dimpled, or counterbored hole and the like.

Having thus described the fastener it now necessary to describe the method of installing. The steps are basically as follows:

A countersunk fastener hole is formed in the structural elements. It is necessary that the countersink be located on the external surface of one of the structural elements. The fastener, with the layer of material joined thereto is installed in the fastener hole. Thereafter, the layer of material is deformed filling any gap between the fastener and the countersink end of the hole and the excess material above that needed to blend the layer of material into conformity with the surface is removed. This is accomplished by a) deforming the material by use of impact, for example that provided by a rivet gun, until the material flows into and fills any gap between the countersunk and fastener. Thereafter, any excess material is removed by sanding, chiseling, shaving or the like. b) the layer of material is heated until it is readily deformable and can be impacted or faired to fill any gaps between the fastener head and countersink. Thereafter, a sharp edged instrument can be used to remove any excess material.

In one preferred embodiment, the head of the fastener incorporates an internal wrenching recess and the layer of material includes a wrenching tool access hole therethrough in communication with the internal wrenching recess in the fastener head. A plug is provided, made of the same material as the layer of material or other compatible materials, which can be inserted into the hole and/or recess after torquing the fastener in place and which will become part of the fastener after the step of deforming.

In another preferred embodiment the layer of material incorporates frangible external wrenching surfaces joined to the layer of material which can be broken off when the proper torque level is reached.

In still another preferred embodiment of the invention the underhead surface of the fastener is conical in shape having a total included angle substantially equal to the total included angle of the countersink hole. The layer of material extends out from the head of the fastener having a conical shaped underside contiguous with the conical underside of the head and having a total included angle substantially equal thereto. Thus, when this fastener is installed into the countersunk fastener hole, no gap will exist between the material layer and countersink, and, little or no deformation of the layer of material need take place, although some deformation may be required to insure line-to-line contact. Thereafter, the excess material can be removed in the manner previously described.

The novel features which are believed to be characteristic of the invention, both as to its organization and method of operation, together with further objects and advantages thereof, will be better understood from the following description in connection with the accompanying drawings in which presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

Illustrated in FIG. 1 is a partial cross-sectional view of the fastener installed in structural elements; the right side of the figure showing the fastener as provided while on the left side the fastener is shown after installation is complete.

Illustrated in FIG. 2 is an enlarged partial cross-sectional view of the fastener shown in FIG. 1.

Illustrated in FIG. 3 is a partial cross-sectional view of a second embodiment of the fastener installed in structural elements; with the right side of the figure showing the fastener as provided while on the left side the fastener is shown after installation is completed.

Figure 4:
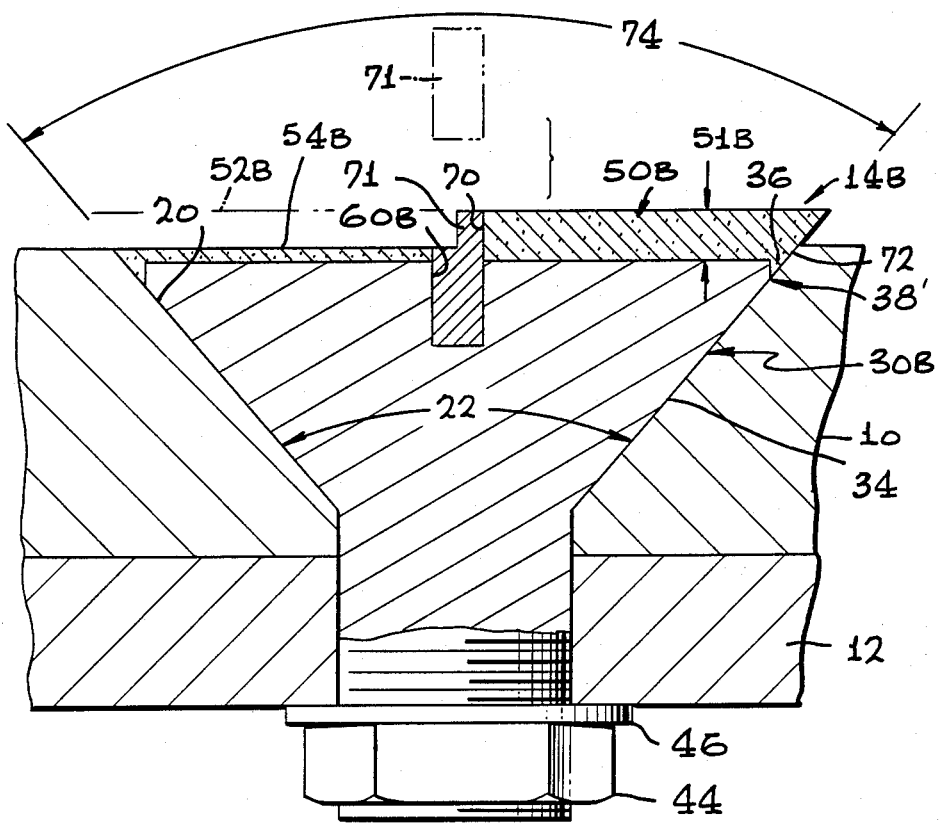

Illustrated in FIG. 4 is a partial cross-sectional view of a third embodiment of the fastener installed in structural elements; with the right side of the figure showing the fastener in the as provided and the left side of the figure the fastener is shown after installation is completed.

Illustrated in FIGS. 5, 6, 7, and 8 are partial cross-sectional views of the fastener illustrating the process by which the fastener is installed in the structural elements.

BEST MODE FOR CARRYING OUT THE INVENTION

Illustrated in FIG. 1 is a partial cross-sectional view of two structural elements, indicated by numerals 10 and 12, respectively, joined together by the improved flush head fastener, generally indicated by numeral 14. The fastener 14 is primarily designed for use on aircraft, and, in particular, to the fastening of external skins or other external structural elements to interior structures. Thus, for purposes of illustration, structural element 10 can be considered the outer skin of an aircraft having an exterior surface 16 exposed to aerodynamic forces and lightning strikes as well as illumination by threat radars. The fastener 14 is shown installed as provided on the right side of the figure and after installation is completed on the left.

The fastener 14 is mounted in a countersunk fastener hole 18 with the countersunk portion 20 in communication with the surface 16 and having a total included angle indicated by numeral 22 (typically 100 degrees for metals and 130 degrees for composites). Fastener 14 includes a head portion 30 having a top surface 32 and a conical shaped underhead surface 34 having a total included angle substantially equal to the angle 22 of the countersink portion 20. The fastener further includes a small cylindrical land 36 at the junction of the top and underhead surfaces 32 and 34, respectively. This land 36 is machined to eliminate any sharp edges that would normally exist at the junction of the surfaces 32 and 34. However, this land 36 is extremely small and is shown out of proportion for illustration purposes only. Thus, a volume indicated by numeral 38 is created between the fastener head and countersink. Also the countersink portion 20 is, typically, larger than the overall diameter of the land 36, thus, the volume 38 is ring shaped. On a contoured surface the volume 38 takes on a more crescent shape.

The fastener 14 further includes a shank portion 40 having a threaded end 42 with an internal wrenching recess 43 and is held in place by means of a nut and washer, indicated by numerals 44 and 46, respectively. Thus, a fastener can be locked in place by use of tools applied from the shank end of the fastener.

Still referring to Figure and additionally to FIG. 2, which is an enlarged view of a portion of the left side of FIG. 1, a layer of material 50 having a thickness 51 (right side of FIG. 1) is joined to the top surface 32 of the fastener 14. If the structural element 10 is steel, or aluminum, the fastener is typically high strength heat treated steel or titanium. The layer 50 would be made of a soft aluminum or titanium material or a solder such as those covered by Federal Standard QQ-S-571, Tin Alloy, Tin-lead Alloy and Lead Alloy Solders. If solder is used for the layer of material it can be heated to a very soft, readily deformable state (having a melting point well below that of the aluminum or titanium structural element 10 or the head and shank of the fastener) such that the structural element or fastener are not effected at this temperature. By a process to be subsequently discussed, the layer of material 50 is deformed so as to fill the volume 38 about the head portion 30 (between the land 36 and countersink portion 20) and, thereafter, the excess material, indicated by dotted lines and numeral 52 on the left side of FIG. 1, is removed. The remaining material layer 54 and surface 16 are blended into one smooth and continuous surface. The overall thickness 51 of the layer of material 50 is therefore selected to provide sufficient material to fill the volume 38 and the remaining unfilled portion of the countersink 20 above the surface 32 of the head portion 30. This thickness will depend upon the allowable (selected) tolerances of the various dimensions of the countersink portion 20 and the head portion 30. The end result is that no discontinuities will exist that could reflect incoming radar signals, the surface is aerodynamically smooth and there are no electrical discontinuities.

If the structural element 10 is a composite material having an organic matrix, such as a thermoplastic or thermosetting resin matrix with fiberglass or Kevlar filamentary reinforcements, then, the layer 50 could be a thermoplastic material such as a polycarbonate; one that melts upon heating and does not cure (with a melting point well below the melting point of the matrix-material). Another suitable material is Nylon 6 manufactured by the Dupont Corporation, Wilmington, Delaware. In either case the metal fastener is protected from lightning strike attachment. If the structural element 10 where made of graphite reinforced PEEK (polyetheretherkeytone) manufactured by ICI, Americas, Inc., Wilmington, Delaware then the layer of material could be a carbon fiber reinforced Nylon 6 to eliminate electrical discontinuities. As can be seen, whether the layer of material is a metal, dielectric material or a dielectric material loaded with conductive fillers will depend upon the particular application.

Illustrated in FIG. 3 is a partial cross-sectional view of a second embodiment of the fastener indicated by numeral 14A. The fastener 14A differs only in having an internal wrenching recess 60 in the head 30A and the elimination of the internal wrenching recess 43 (see FIG. 1) from the shank 40A. All of the other previously mentioned dimensions of the fastener are identical, and thus, have the same identifying number. The layer of material, indicated by numeral 50A, having a thickness 51A, incorporates external wrenching surfaces 62 connected by means of a necked down frangible portion 64. Thus, the nut 44 can be prevented from rotation as the fastener is torqued. However, in most applications the fastener would be engaging a plate nut (not shown). When the proper torque level is reached the wrenching surfaces 62 can be "torqued off" separating at the necked down portion 64. Thereafter, the same procedure is used, which again will be subsequently discussed, to produce the completely installed fastener with excess material 52A removed leaving remaining layer 54A, as illustrated on the left side of FIG. 3.

Illustrated in FIG. 4 is a third embodiment of the fastener. The fastener 14B includes a wrenching recess 60B the head 30B and in the layer of material 50B includes an aperture 70 in communication with the recess 60B. Thus, as in the embodiment illustrated in FIG. 3, the fastener 14B can be prevented from rotation when the nut 44 is torqued (or vice versa). A plug 71, preferably made as the same material of the layer of material 50B or another suitable material, is provided which can be inserted into the recess 60B after the fastener 14B has been locked in place (left side of FIG. 4). The layer 50B, having a thickness indicated by 51B, includes an underhead surface 72 with an included angle 74 equal to angle 22 of the countersink hole and extends upward and outward so as to almost completely fill the countersink (leaving only the small volume 38' between the land 36 and countersink 20). This makes the filling of the countersink by the process to be subsequently discussed much easier. Once the fastener is installed, the insert or plug is installed (driven in place by a hammer or the like) prior to removing excess layer material 52B, leaving remaining layer 54B. If the fastener needs to be removed, the plug can be "dug out", preferably after heating to soften it.

Having thus described three embodiments of the improved fastener, it is readily apparent that the features of each can be interchanged. For example, the concept of a conically shaped underhead of the layer of materials 50B in the embodiment illustrated in FIG. 4, can be used in the embodiments illustrated in FIGS. 1 and 3. Since the discussion of the physical embodiments of the fasteners prior to installation and after final installation has been completed, it is necessary to now discuss the procedure for installing fastener.

Figure 5:
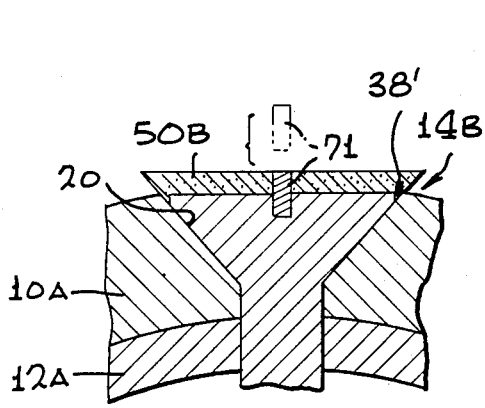
Figure 6:
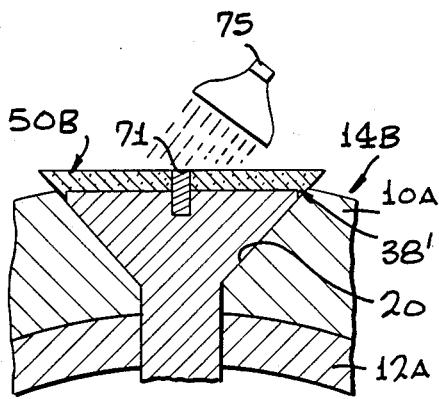
Figure 7:
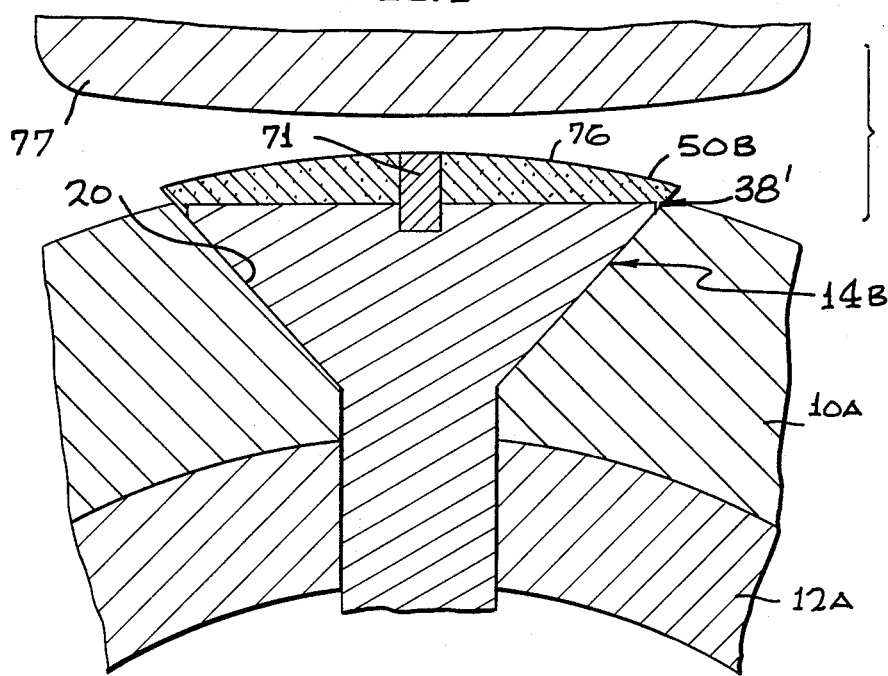
Figure 8:
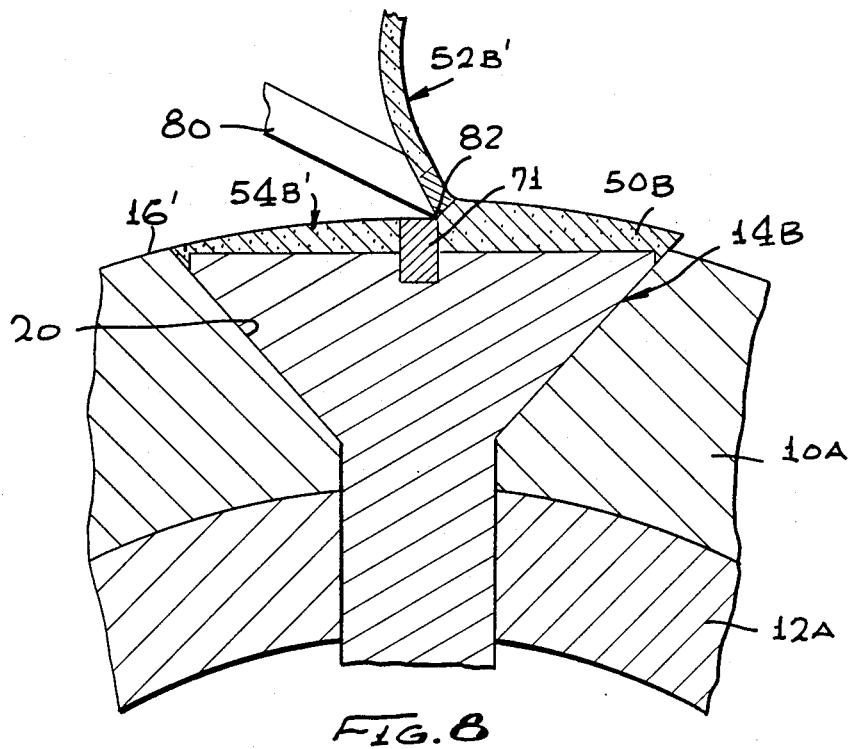

Referring to FIG. 5, it can be seen that the fastener which was illustrated in FIG. 4 is used as an example. After the fastener has been locked in place, in curved structural elements 10A and 12A, the plug 71 is driven into place as illustrated. Thereafter, as illustrated in FIG. 6, heat is applied to the material layer 50B and plug 71 until, the materials are soft and easily deformable (as illustrated, a heatlamp 75 is used). Illustrated in FIG. 7, the layer 50B and plug 71 are tapped down to firmly drive the layer of material 50B into contact with the countersink 20 and filling volume 38'. This step typically deforms the layer of materials 50B so that it has an irregular surface, indicated by numeral 76. This can easily be accomplished by use of a rivet gun, partially illustrated and indicated by numeral 77. In many cases, little or no impact will be required and the step 50 can be eliminated. However, with the embodiments illustrated in 1 and 3, considerable impact may be necessary to achieve filling of the volume 38'. It must also be noted that if the layer of the material and plug is soft at room temperature heat may not be necessary. Furthermore, if heat is applied, it may be possible to soften the layer of material 50B sufficiently so that little tapping or driving is necessary. Regardless, of whether the layer of material 50B requires heating and driving, heating alone or driving alone, the next step as illustrated in FIG. 8 is to remove the excess material 52B' leaving remaining layer 54B'. This is easily accomplished by use of a chisel 80 having a knife edge 82 conforming to the contour of the curved surface 16'. It is important to note that if the structural element 10 is a composite material with an organic matrix, the layer of the material 50B and plug 71, ideally would be a thermoplastic material, which would require heating to make it deformable.

In some applications it may be desirable to heat the layer of material to a temperature wherein it melts and is easily flowable provided the structural elements can withstand the temperature. This would eliminate the need for impact. The main advantage of melting is the elimination of any gaps between the fastener head portion and the countersink improving electrical continuity, etc. However, some difficulty may be encountered in removing excess material and providing a smooth surface. Melting could easily be accomplished when using a solder, thermoplastic or even thermosetting materials such as an epoxy.

Thus, the main advantages of the fastener are readily apparent: 1) it can provide a smooth aerodynamic surface. 2) can provide a surface with no electrical discontinuities. 3) can be used with both metal and composite structures. 4) can provide lightning strike protection. Other advantages are a reduced tendency to rotate and loosen, in some applications the tolerances on the countersink end of the hole can be relaxed and it may be possible to eliminate corrosion resistant coatings or sealants on the fastener or hole where such coatings or sealants are presently required. Furthermore, while primarily designed for use on aircraft the fastener has application on external surfaces of land vehicles and ships, internal fluid ducts in general or on any surface for cosmetic purposes. In this latter application it is apparent that the concept is applicable to fasteners having plastic heads and shanks as long as the plastic has a higher strength and/or higher melting point than the layer of material.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to vehicles and structures and, in particular, to aircraft.

We claim:

1. A flush head fastener, the fastener for joining two or more structural elements together, the structural elements having a fastener hole therein with a recess for receiving the head of the fastener in communication with one surface of the structural elements, the fastener comprising:

a shank;

a head joined to said shank; and a layer of non-resilient material permanently joined to and generally covering the entire top surface of said head of the fastener, said layer of material readily reconfigurable relative to said head and the structural elements;

such that upon installation of the fastener in the hole said layer of material can be reshaped by deformation filling any gap between said head, said layer of material of the fastener and the recessed end of the hole, and the excess material above that needed to blend said layer of material into substantial conformity with the one surface of the structural elements can be readily removed.

2. The flush head fastener as set forth in claim 1, wherein said layer of material has a melting point substantially lower than the melting point of said head and shank of the fastener and the structural elements such that after installation said layer of material can be raised to a temperature wherein its reconfigurable properties are enhanced.

3. The flush head fastener as set forth in claim 1, wherein said recess is a countersink.

4. The flush head fastener as set forth in claim 3, wherein the countersink is conical in shape having a specific total included angle, the fastener further comprising:

said head having a conically shaped underhead having a total included angle generally equal to the total included angle of the countersunk hole; and said layer of material extending outward and upward from the top surface of said head, said layer of material having a conically shaped underhead contiguous and aligned with and having a total included angle generally equal to said conical underside of said head.

5. The flush head fastener as set forth in claim 4, wherein said layer of material is a conductive material.

6. The flush head fastener as set forth in claim 5 wherein said layer of material is a metal.

7. The flush head fastener as set forth in claim 5, wherein said layer of material is a dielectric material loaded with conductive fillers.

8. The flush head fastener as set forth in claim 4, wherein said layer of material is a dielectric material.

9. The flush head fastener as set forth in claim 4, wherein said layer of material is selected from the group consisting of a thermoplastic and thermosetting materials.

10. The flush head fastener as set forth in claims 1 or 2 or 3 or 4 or 5 or 6 or 7 or 8 or 9 wherein frangible external wrenching surfaces are attached to the top of said layer of material.

11. The flush head fastener as set forth in claim 1 or 2 or 3 or 4 or 5 or 6 or 7 or 8 or 9 wherein:

said head incorporates an internal wrenching recess;

said layer of material incorporates a wrenching tool access hole therethrough in communication with said the internal wrenching recess; and a plug made of a compatable material for filling said recess in said head and said hole in said layer of material.

12. The flush head fastener as set forth in claim 11, wherein said plug is made of a material generally identical to said layer of material.

* * * * *